United States Patent [19]
Brown

[11] Patent Number: 5,983,676
[45] Date of Patent: Nov. 16, 1999

[54] LASER FIBER CHOPPER

[75] Inventor: Bari W. Brown, Ann Arbor, Mich.

[73] Assignee: Lear Corporation, Southfield, Mich.

[21] Appl. No.: 09/080,574

[22] Filed: May 18, 1998

[51] Int. Cl.⁶ .............................. C03B 9/46; C03B 37/16; C03B 5/18; C03B 21/02
[52] U.S. Cl. ........................ 65/536; 65/174; 219/121.6; 219/121.67; 219/121.72; 83/913
[58] Field of Search .............................. 65/174, 176, 480, 65/483, 536; 219/121.6, 121.61, 121.66, 121.67, 121.72; 83/913

[56] References Cited

U.S. PATENT DOCUMENTS

| | | |
|---|---|---|
| 3,930,825 | 1/1976 | Chui . |
| 4,088,890 | 5/1978 | Waters ..................................... 250/202 |
| 4,158,555 | 6/1979 | Kallenborn ................................ 65/113 |
| 4,212,216 | 7/1980 | Ives . |
| 4,373,650 | 2/1983 | Gay . |
| 4,682,003 | 7/1987 | Minakawa et al. . |
| 4,867,775 | 9/1989 | Cain et al. ................................ 118/689 |
| 5,500,505 | 3/1996 | Jones . |
| 5,645,231 | 7/1997 | Smith . |
| 5,697,560 | 12/1997 | Bennett . |

Primary Examiner—Stanley S. Silverman
Assistant Examiner—Jacqueline A. Ruller
Attorney, Agent, or Firm—Emch, Schaffer, Schaub & Porcello Co., L.P.A.

[57] ABSTRACT

This apparatus uses laser beams in place of existing standard glass chopper units affixed to resin mix heads. Conventional glass choppers use steel blades that eventually wear out or break, adding to maintenance costs. The laser device operates in a manner that allows one to set the pulse rate for the specific purpose of varying the fiber length. During the injection operation, intensity of the laser may be adjusted to accommodate cutting or different sizes and kinds of fibers. The laser apparatus preferably produces long fiber reinforced urethane substrates such as interior door panels for automobile doors.

19 Claims, 3 Drawing Sheets

LASER FIBER CHOPPER

TECHNICAL FIELD

This invention relates to a laser fiber chopper or gun which may be used, for example, to break continuous rovings such as glass fiber strands into discrete fiber lengths, the lengths being discharged from the chopper or gun at high velocity in a fluid jet stream.

BACKGROUND ART

Glass choppers use fluid or electric powered blade rotors to break continuous glass rovings into individual short glass fiber lengths. These choppers use a hard rubber back up roll as an anvil which cooperates with a rotor carrying one or more transversely extending blades. The back up roll and rotor cooperate to chop a discrete glass fiber length off the continuous roving each time a rotor blade contacts the back up roll.

Continuous fiberglass filaments are manufactured by flowing molten glass through a bushing, followed by attenuating the material. The resultant filaments, after solidifying, may then be directed to another area for conversion into desired products, or collected on a bobbin for storage prior to further processing. Formation of the filaments also normally involves treating the filaments with a size to enhance the properties of the fiberglass in subsequent operations.

Continuous filaments include a single filament or a plurality of filaments in a strand, with the filament having a continuous length or substantial length, e.g., greater than one foot. A plurality of filaments is a plurality of segments of a single filament in adjacent relationships, such as occurs when a single filament is wrapped around a bobbin tube.

Typically, fiberglass packages are formed from continuous filaments wound onto a tube. The inner end of the filament is then pulled from within the interior of the package to unwind the filament. This interior end feeds into the glass chopper.

Fiber choppers are employed in conjunction with liquid resin spray dispensers to form a stream of resin-impregnated chopped fibers that are laid down on a substrate to form a glass fiber reinforced structure. Typically, a fiber chopper has a body or housing, a backing roller and a chopping roller. As an elongated glass fiber strand passes between the rollers, it is chopped into relatively short fiber segments and propelled by the action of the rollers out through a nozzle opening in the body of the chopper. The body and thus the nozzle are oriented so as to direct the stream of fibers into intersecting relationship with a stream of catalyzed resin, thus forming a stream of resin-impregnated chopped fibers. The stream of resin impregnated fibers is directed toward a substrate, and is allowed to impinge the substrate and form a layer of resin-impregnated fibers on the substrate. Typical products include auto body parts, underground storage tanks and boats.

DISCLOSURE OF INVENTION

The laser beams of this invention replace existing standard glass chopper units used in conjunction with resin mix heads. Conventional glass choppers use steel blades that eventually wear out or break, adding to maintenance costs. The laser device operates in a manner that allows me to set the pulse rate for the specific purpose of varying the fiber length. During the injection operation, intensity of the laser may be adjusted to accommodate cutting of different sizes and kinds of fibers.

The lasers I use in my glass fiber chopper may vary widely. The device produces a beam of coherent or monochromatic light as a result of photon-stimulated emission. The beams have extremely high energy, as they consist of a single wave-length and frequency. I designed my laser chopper for use in producing long fiber reinforced urethane products such as interior panels for automobile doors.

I designed the laser chopper of this invention to produce chopped fibers having a length ranging from ½ inch to 6 inches. In a second embodiment, however, the laser chopper can cut lengths as short as ¼ inch. In still another embodiment, the laser chopper can cut fibers of varying length. With the aid of a programmable controller, the laser can vary the length of fibers during its operation. For example, when producing fibers for a molding operation of ribbed part, the laser can produce short fibers for the ribs and long fibers for the body of the part. A programmable controller (PLC) easily can control the laser to vary fiber lengths during chopping. Typically, the PLC and laser chopper are used with a robotic arm to produce the desired chopped fiber pattern.

BEST MODE OF CARRYING OUT INVENTION

The laser I use in my glass fiber chopper may vary widely. The device produces a beam of coherent or monochromatic light as a result of photon-stimulated emission. The beams have extremely high energy, as they consist of a single wave-length and frequency. Materials capable of producing this effect are certain high-purity crystals (ruby, yttrium garnet, and metallic tungstates or molybdates doped with rare-earth ions). Other materials include semiconductors such as gallium arsenide, neodymium-doped glass; and various gases, including carbon dioxide, helium, argon and neon; and plasmas.

In one embodiment, this non-contact cutting method cuts or chops the glass fibers at high speeds using a diffraction-limited neodymium (Nd) yttrium-aluminum-garnet (YAG) laser operated in a high peak power mode at a high pulse rates. In this manner, the fibers can be cut with a minimal heat affected zone (HAZ). Selective and multiple wave-length processing is employed. In applying the laser, different and multiple wavelengths are used to rapidly cut the fibers with minimal physical damage and with minimal heat damage to the fibers.

Figure 1:
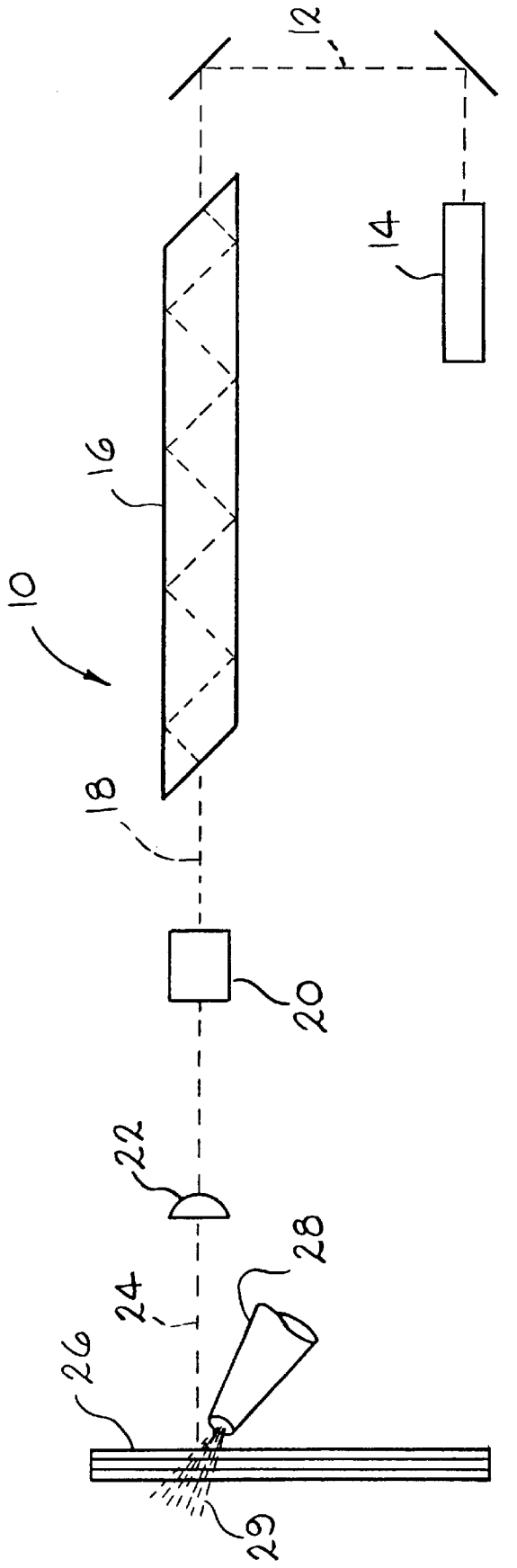
FIG. 1 is a perspective view of the laser beam of this invention.

FIG. 1 illustrates a schematic block diagram 10 of cutting fibers with a laser operated in a high peak power mode at high pulse rates, in accordance with the prevent invention. Specifically, a beam 12 from oscillator 14 is applied to an amplifier 16. The oscillator 14 may be any low power oscillator capable of generating a beam that is diffraction limited, i.e., the best available beam, such as a commercially available diffraction-limited Nd:YAG laser or rod laser oscillator. The amplifier 16 may be any suitable amplifier capable of amplifying beam 12 while preserving the beam quality, and is preferably a slab laser amplifier which is commercially available. The advantage of a slab laser amplifier is that it can maintain the beam quality from the oscillator.

FIG. 1 also shows amplified beam 18 output from amplifier 16 applied to a Q-switch crystal 20. Switch 20 may be any suitable commercially available Q-switch device, preferably capable of providing a very short pulse length. For the same energy content, a shorter pulse length pulse has greater peak power than a longer pulse length pulse. The amplified beam 18 is then focused, i.e. reduced in cross-section, at focusing lens 22. The focused beam 24 then cuts fiber 26.

In a preferred embodiment, cuts are achieved at average powers greater than 40 watts, with pulse rates greater than 3,000 pulses/second. The peak energy is preferably between 6 and 10 mJ, and cutting speeds are preferably between 10 and 25 ipm. Cutting is preferably performed in an inert environment, such as a $N_2$ purge. These parameters result in clean cuts with minimal HAZ.

Several combinations of wavelengths are possible, including, but not limited to the following. A first combination comprises the fundamental and frequency doubled Nd:YAG wavelengths (i.e., a 1.06 micron wavelength and a 0.530 micron wavelength). This combination provides increased coupling and power density for the same optics because of the shorter wavelength components, since all produced laser energy is used.

FIG. 1 also shows that gas nozzle 28, such as a nitrogen ($N_2$) or carbon dioxide ($CO_2$) gas nozzle can be included to protect the fibers during the process. Gas 29 emitted from nozzle 28 changes the environment in which the fibers are cut. The gas can be used to prevent the formation of oxides or burning of the fibers. Hence, cutting can be performed in an inert environment.

Figure 2:
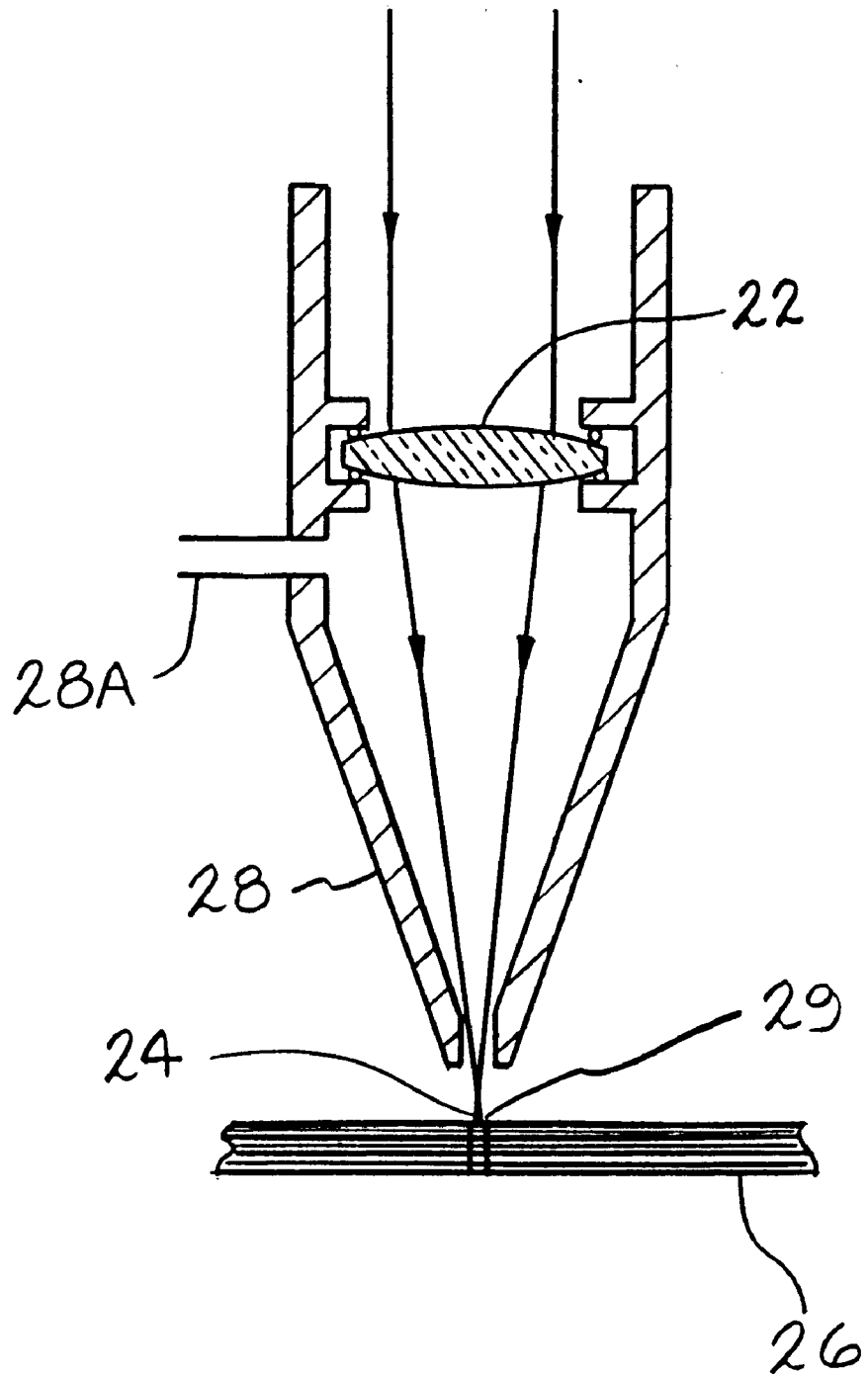
FIG. 2 is an enlarged fragmentary view showing another embodiment of the laser beam cutting device of FIG. 1.

FIG. 2 shows nozzle 28 and laser beam 24 combined into a unitary piece of apparatus. In this embodiment, nozzle 28 requires gas inlet 28A.

The cutting process is essentially one of material removal from the cut or kerf. The effectiveness of a laser for cutting can be increased by the use of a gas jet with laser beam. The gas jet usually is an inert gas such as $CO_2$ or $N_2$. The gas aids in cooling the fibers resulting in a square edge cut. The cooling effect outside the beam focus is normally large enough to prevent burning outside this region at high speeds. A limited amount of carbonization at the cut edge occurs, however, with or without an inert environment. Often, air at high speeds may prevent burning of the fiber cut. At slow speeds, one should use can inert gas to prevent excessive carbonization. The effect is little more than discoloration and decreases with faster cutting speeds.

The inert gas nozzle and the fluid discharge block for discharging the cut fibers can be the same piece of equipment.

Figure 3:
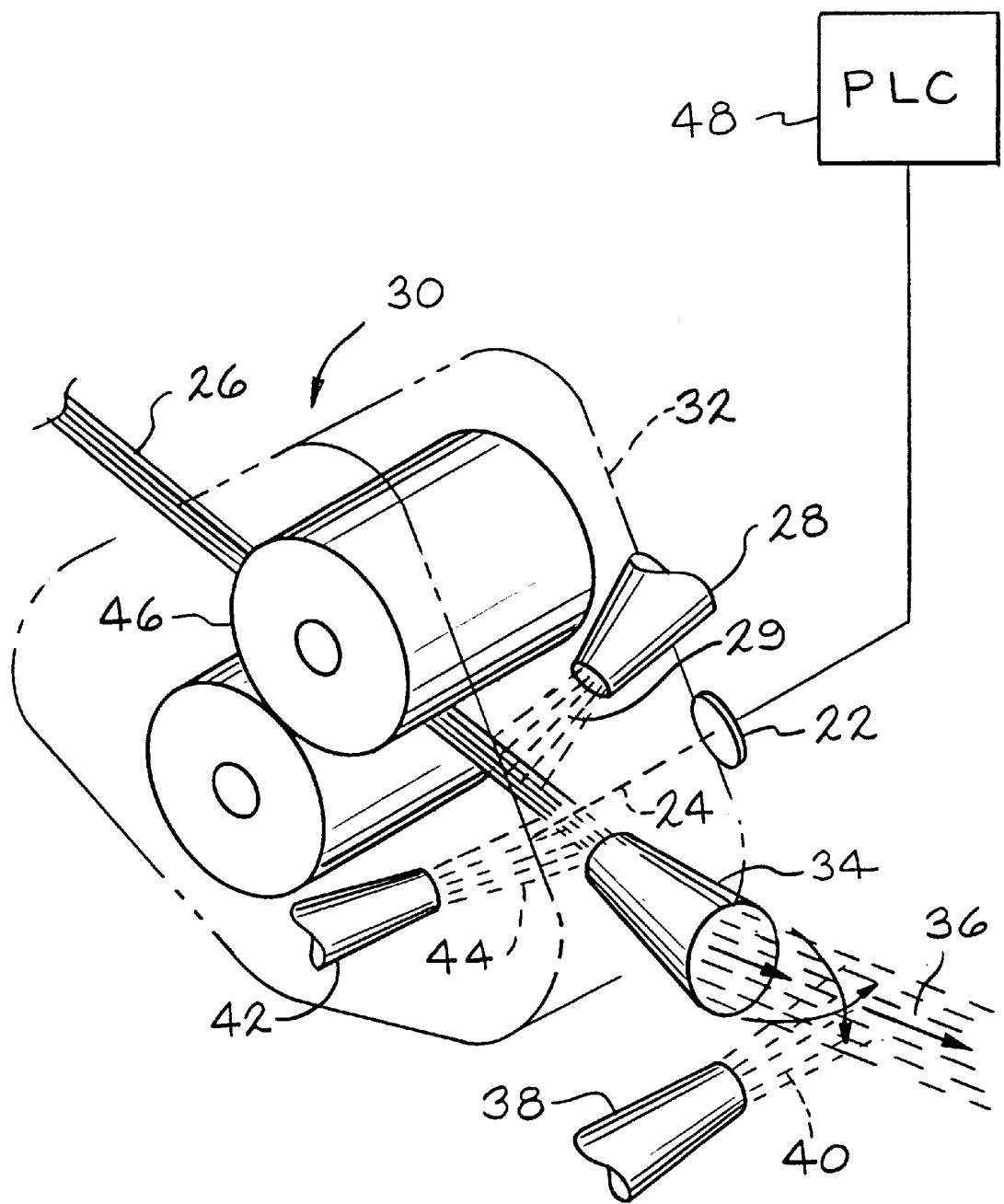
FIG. 3 is a perspective view of an apparatus combining the laser glass chopper with a resin mixing head.

FIG. 3 also show chopper 30 having body 32 and nozzle 34. Nozzle 34 may have any configuration. Nozzle 34 alone or with a deflector (not shown) causes all of the fiber segments issuing from nozzle 34 to form fiber stream 36. Resin spray head 38 then directs resin spray 40 at fiber stream 36. Resin spray head 38 is normally situated immediately below the fiber chopper 30.

FIG. 3 also shows fluid discharge block 42 discharging fluid (air) 44. Block 42 is used if necessary in the event that nip rollers 46 do not propel fibers 26 with sufficient force to discharge nozzle 34. In another embodiment, nozzle 28 and inert gas 29 may be used to propel fibers 26. In this event, block 42 is not needed. In still another embodiment, block 42 and nozzle 28 may not be needed. Faster cutting speeds may eliminate the need for these units. Programmable controller (PLC) 48 adjusts laser beam 24 to vary the chopped fiber length as desired during the chopping operation.

The production efficiency of this laser glass fiber chopping apparatus is greatly improved by use of the continuous cutter in accordance with the present invention. Downtime due to individual blade replacement is effectively eliminated and in actual usage, the continuous cutter has operated satisfactorily indefinite periods of time. This compares to an average production life of less than 24 hours for a replaceable blade type cutter head. Even improved cutter rings, cutter wheels or hoops using chisel-shaped teeth have a finite life of one or two weeks.

The industry typically uses polyester resins in spray-up applications for producing auto body parts, underground storage tanks and boat hulls. While my apparatus may be used in such applications, I designed my laser chopper for use in producing fiber reinforced polyurethane products.

One industrial application for the laser chopper of this invention is compression molding of interior trim panels for automobile doors. Vinyl panels first are vacuumed formed and transferred to the open mold of a compression mold. The laser chopper than sprays chopped glass fiber strands onto the vinyl preform. The chopped strands range in length from ½ inch to 6 inches. The glass is shaped onto the vinyl preform with a polyol, isocyanate (—NCO) urethane resin mixture. The resulting polyurethane contained a small amount of blowing agent to yield a polyurethane foam having a density of about 0.5 lbs/ft$^3$. The densities, however, may range from 0.25 to 2.0 lbs/ft$^3$. More specifically, a polyol such as polypropylene glycol is treated with a diisocyanate in the presence of some water and a catalyst (amines, tin soaps, organic tin compounds). As the polymer forms, the water reacts with the isocyanate groups to cause crosslinking and also produces carbon dioxide, which causes foaming. In other cases, trifluoromethane or similar volatile material may be used as blowing agents.

The glass loading is the polyurethane was about 15 to 18 weight percent. The polyurethane foam, however, may contain 10 to 60 weight percent glass fibers. Additional trim may be included in the mold, such as carpet panels. After compression molding, the part is ready for fastening to an automobile door. The glass loading and spray pattern can be tailored as desired with the use of a programmable controller. For example, ribs molded into the panel require high glass loadings of short fibers in the rib area. Edges of the panel require additional glass for added strength.

Weight percent as used herein is based on weight average molecular weight.

While compression molding demonstrates the industrial uses for this laser chopper, one can use the laser to produce a wide variety of substrates with a wide variety of molding operations. The laser easily lends itself to use with, for example, resin inspected molding (RIM). The laser easily works with other fibers, such as polyamides (nylon), mineral fibers, aramid (Kevlar) fibers and the like.

While we show the fiber spray and resin spray coming together before spraying the substrate to be molded, these streams can be combined, separated or run independently of each other. The streams also can be mixed from concentric tubes with the fibers preferably being fed by the center tube. One also could first spray the fibers into a mold before pouring in the resin.

Although the now preferred embodiments of the invention have been set forth, it will be apparent to those skilled in the art that various changes and modifications may be made thereto without departing from the spirit and scope of the invention as set forth in the following claims.

I claim:

1. An apparatus for chopping continuous fibers into discrete fiber lengths comprising:
   a laser creating a laser beam;
   means for feeding continuous fibers into the laser beam wherein the continuous fibers are glass fiber strands;
   means for discharging discrete fiber lengths from the laser beam;
   a fluid discharge block for propelling the discrete fiber lengths from the laser; and
   a controller that controls the laser to rapidly cut the grass fiber strands with minimal physical damage and with minimal heat damage to the glass fiber strands.

2. An apparatus according to claim 1 wherein the laser is in a high peak mode and at high pulse rates.

3. An apparatus according to claim 1 including a body for housing the laser.

4. An apparatus according to claim 1 including a means for providing an inert environment for the laser beam.

5. An apparatus according to claim 1 including a nozzle for discharging an inert gas at the laser beam.

6. An apparatus according to claim 1 wherein the laser includes means for effecting different and multiple wavelengths in the laser beam.

7. An apparatus according to claim 1 wherein the laser is a diffraction-limited neodymium yttrium-aluminum-garnet laser.

8. An apparatus according to claim 1 wherein the means for feeding the continuous fibers is a pair of nip rollers which pull the continuous fibers and propels them into the laser beam.

9. An apparatus according to claim 1 wherein the means for discharging discrete fiber lengths is a discharge nozzle.

10. An apparatus according to claim 9 including a fluid discharge block, wherein the fluid discharge block and discharge nozzle are aligned with the discrete fiber lengths therebetween.

11. An apparatus according to claim 1 wherein the means for discharging the discrete fiber lengths causes the fiber lengths to be ejected along a primary path, including a means for directing a resin spray into the primary path of the fiber lengths.

12. An apparatus according to claim 1 including a programmable controller controlling the laser to vary the fiber lengths from the laser beam.

13. An apparatus for chopping continuous fibers into discrete fiber lengths comprising:
    a laser creating a laser beam;
    a body for housing the laser;
    means for feeding continuous glass fiber strands into the body;
    means for directing the laser beam at the strands;
    means for discharging discrete strand lengths from the body;
    a fluid discharge block for propelling the discrete fiber lengths from the body; and
    a controller that controls the laser to rapidly cut the strands with minimal physical damage and with minimal heat damage to the strands; and
    wherein the means for discharging the discrete strand lengths causes the strand lengths to be ejected from the body along a primary path, wherein the body includes a means for directing a resin spray into the primary path of the strand lengths.

14. An apparatus according to claim 13 wherein the discrete strand lengths have a length ranging from ½ inch to 6 inches.

15. An apparatus according to claim 13 wherein the resin spray is a urethane resin spray.

16. An apparatus according to claim 15 wherein the resin spray is a polyol, isocyanate resin mixture containing a small amount of blowing agent to yield a polyurethane foam having a low density.

17. An apparatus according to claim 16 wherein the resulting polyurethane foam has a density ranging from 0.25 to 2.0 lbs/ft$^3$ and contains 10 to 60 weight percent glass fibers.

18. An apparatus according to claim 17 wherein the resulting polyurethane foam has a density of about 0.5 lbs/ft$^3$ and contains 15 to 18 weight percent glass fibers.

19. An apparatus according to claim 13 including a programmable controller controlling the laser to vary the fiber lengths from the laser beam.

* * * * *